(12) United States Patent
Chen et al.

(10) Patent No.: US 7,715,177 B2
(45) Date of Patent: May 11, 2010

(54) MOUNTING APPARATUS FOR POWER SUPPLY

(75) Inventors: Yun-Lung Chen, Taipei Hsien (TW); Gang Su, Shenzhen (CN); Wan-Cheng Lin, Taipei Hsien (TW); Jian-Wei Shi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 44 days.

(21) Appl. No.: 12/140,324

(22) Filed: Jun. 17, 2008

(65) Prior Publication Data
US 2009/0262498 A1 Oct. 22, 2009

(30) Foreign Application Priority Data
Apr. 18, 2008 (CN) .................. 2008 2 0300584 U (51) Int. Cl.
 *G06F 1/16* (2006.01)
(52) U.S. Cl. ................................. 361/679.01
(58) Field of Classification Search ............. 361/679.01
 See application file for complete search history.

(56) References Cited

U.S. PATENT DOCUMENTS

| | | | | | |
|---|---|---|---|---|---|
| 5,136,468 | A | * | 8/1992 | Wong et al. | 361/679.6 |
| 5,172,305 | A | * | 12/1992 | DeWilde | 361/796 |
| 5,224,019 | A | * | 6/1993 | Wong et al. | 361/679.37 |
| 5,306,079 | A | * | 4/1994 | Liu | 312/223.2 |
| 5,973,918 | A | * | 10/1999 | Felcman et al. | 361/679.6 |
| 6,229,696 | B1 | * | 5/2001 | Lin et al. | 361/679.58 |
| 6,270,046 | B1 | * | 8/2001 | Liu et al. | 248/231.9 |
| 6,288,332 | B1 | * | 9/2001 | Liu et al. | 361/679.58 |
| 6,483,696 | B1 | * | 11/2002 | Gan | 361/610 |
| 6,700,777 | B2 | * | 3/2004 | Chen | 361/679.33 |
| 6,717,803 | B2 | * | 4/2004 | Cannon | 361/679.58 |
| 7,548,416 | B2 | * | 6/2009 | Lin et al. | 361/679.33 |

* cited by examiner

*Primary Examiner*—Lisa Lea-Edmonds
(74) *Attorney, Agent, or Firm*—D. Austin Bonderer (57) ABSTRACT

A power supply securing system includes a securing bracket (30) and a computer case (50). The securing bracket includes a securing portion (371), and is capable of receiving a power supply (10). The computer case includes a first side panel (53) and a second side panel (55) that is parallel to the first side panel. The first side panel includes a blocking member (533) capable of abutting the securing bracket and a securing piece (531) received by the securing bracket. The second side panel includes a tab (555). The securing bracket is pivotably mounted to the computer case about the securing piece and the securing bracket is capable of moving between a first position and a second position. The tab is engaged with the securing portion in the first position and is not engaged with the securing portion in the second position.

20 Claims, 10 Drawing Sheets

MOUNTING APPARATUS FOR POWER SUPPLY

BACKGROUND

1. Field of the Invention

The present invention relates to mounting apparatuses, and more particularly to a mounting apparatus for securing a power supply in a computer system.

2. Description of Related Art

A conventional computer system usually includes a power supply in a computer case. The installation of the power supply in the computer case usually involves the use of screws.

For example, a computer case for mounting a power supply is provided. The computer case includes a rear panel, a fixing bracket attached to the rear panel, and a bridge attached to the fixing bracket. The rear panel defines an opening therein. The fixing bracket includes a first sidewall and a second sidewall opposite each other. A receiving space is defined between the first sidewall and the second sidewall in communication with the opening in the rear panel adapted for receiving the power supply therein. The bridge includes a first end and a second end respectively connected to the first and second sidewalls of the fixing bracket for positioning and fastening the power supply. The bridge is secured to the fixing bracket by screws.

However, it is inconvenient to use the screws to secure the power supply to the computer case or remove the power supply from the computer case. The screws are small and difficult to manipulate and install. Additionally, because of their small size, the screws may be dropped by an assembler, possibly causing damage to other parts in the computer case.

What is needed, therefore, is a mounting apparatus, which allows convenient securing and removing of a power supply in a computer case.

SUMMARY

A power supply securing system includes a securing bracket and a computer case. The securing bracket includes a securing portion, and is capable of receiving a power supply. The computer case includes a first side panel and a second side panel that is parallel to the first side panel. The first side panel includes a blocking member capable of abutting the securing bracket and a securing piece received by the securing bracket. The second side panel includes a tab. The securing bracket is pivotably mounted to the computer case about the securing piece and the securing bracket is capable of moving between a first position and a second position. The tab is engaged with the securing portion in the first position and the tab is not engaged with the securing portion in the second position.

Other advantages and novel features of the present invention will become more apparent from the following detailed description of a preferred embodiment when taken in conjunction with the accompanying drawings, in which:

DETAILED DESCRIPTION

Referring to FIGS. 1 through 5, a mounting apparatus for a power supply 10 of an embodiment of the present invention includes a computer case 50, a securing bracket 30 mounted on the computer case 50 for securing the power supply 10 thereto, and a top panel 70. A pair of notches 11 is defined in two opposite sidewalls of the power supply 10 respectively, and each notch 11 includes a wide portion 113 and a narrow portion 115 connected to the wide portion 113.

Figure 1:
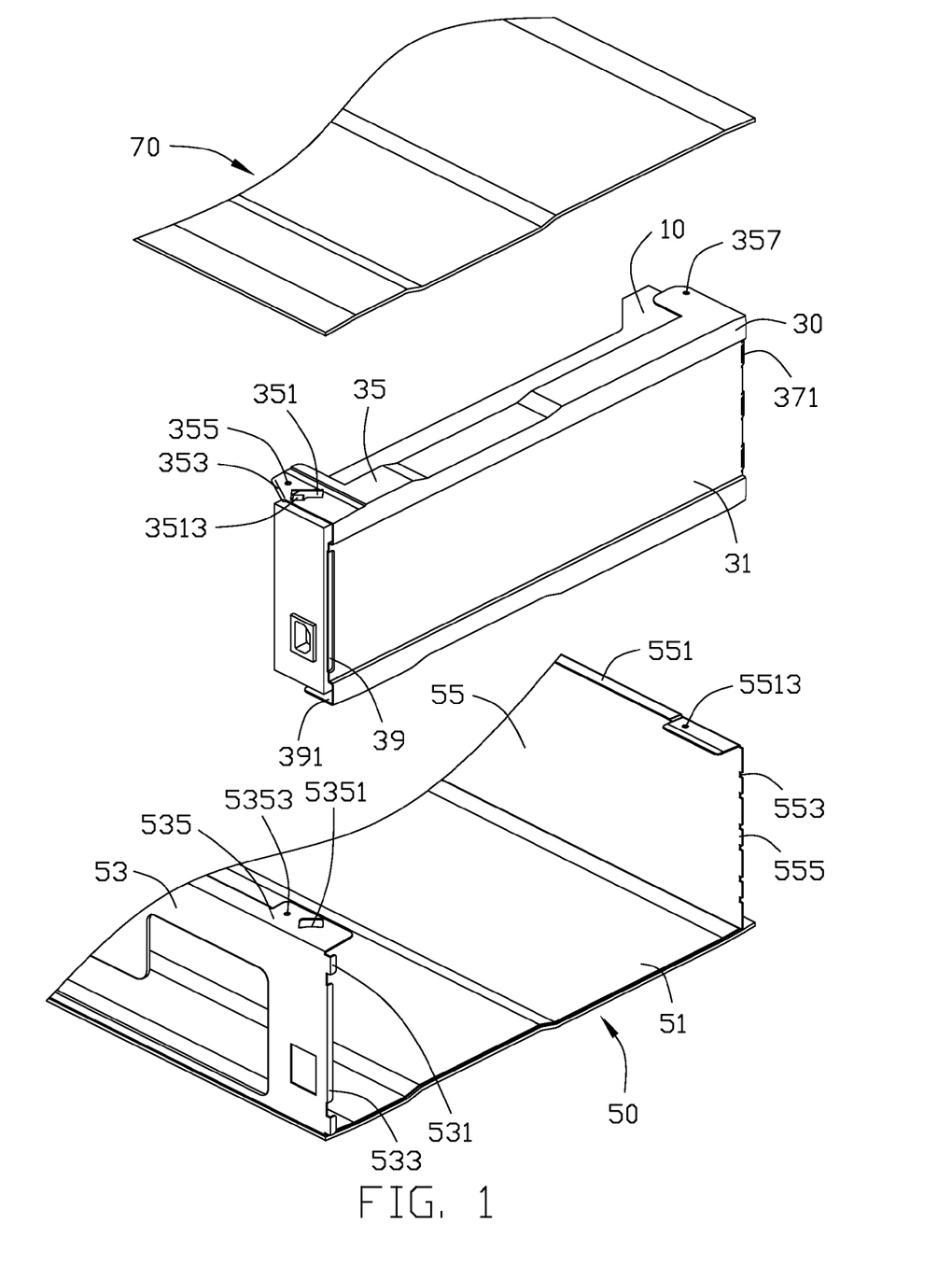
FIG. 1 is an exploded, isometric view of an embodiment of a mounting apparatus for a power supply, the mounting apparatus including a computer case, a securing bracket together with the power supply, and a top panel.
Figure 4:
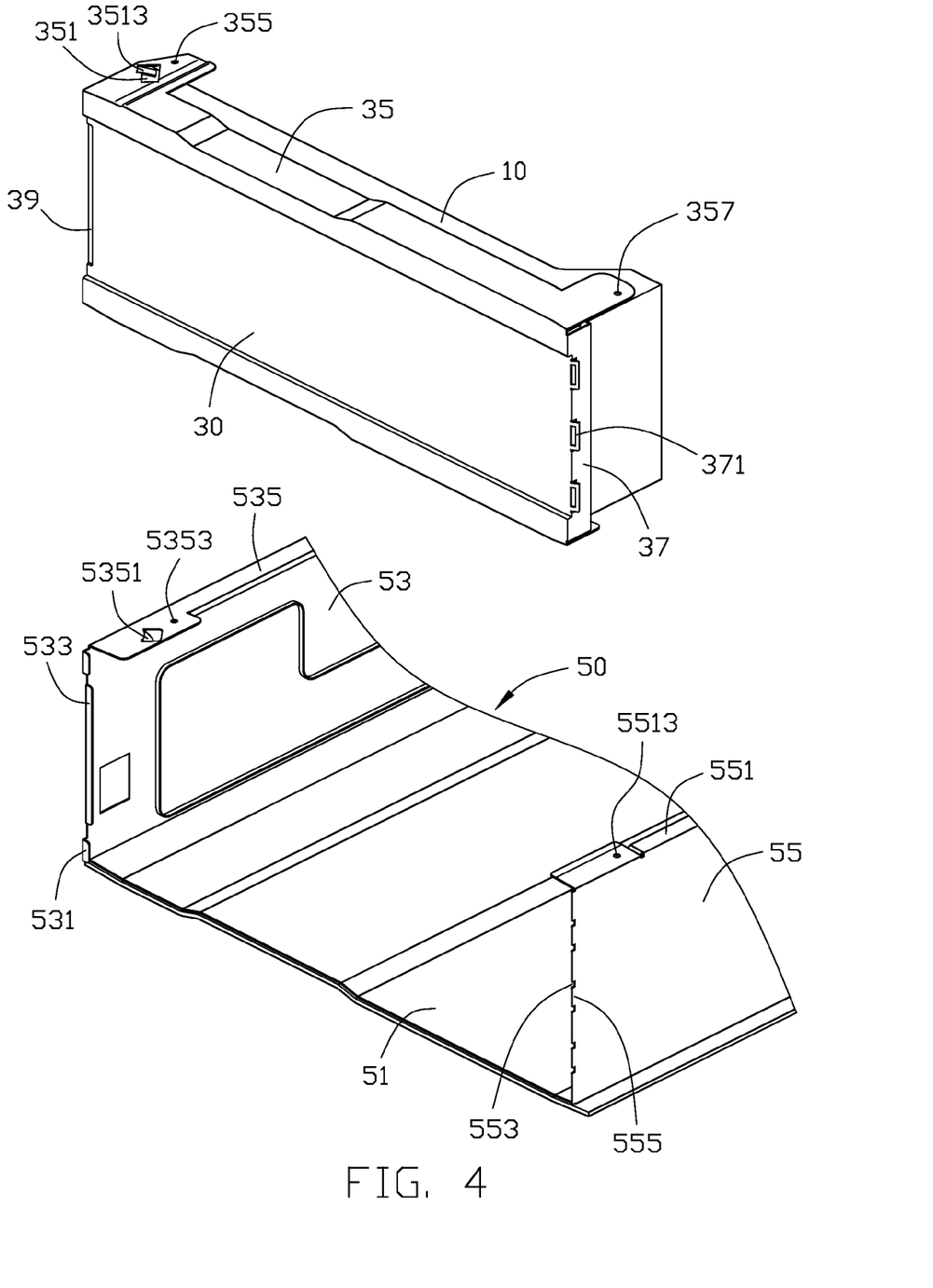
FIG. 4 is similar to FIG. 1, but viewed from another aspect, and not showing the top panel.

The computer case 50 includes a bottom panel 51, a first side panel 53 perpendicular to the bottom panel 51, and a second side panel 55 perpendicular to the bottom panel 51 and parallel to the first side panel 53. A bent flange 535 is perpendicularly bent in from a top edge of the first side panel 53, and a resilient clip 5351 is punched on one side of the bent flange 535 toward the bottom panel 51. The bent flange 535 defines a mounting hole 5353 adjacent to the resilient clip 5351. A narrow blocking member 533 perpendicularly extends from the center of a side edge of the first side panel 53 toward the second side panel 55. Two securing pieces 531 are bent perpendicularly from the side edge adjacent to two sides of the blocking member 533, toward the second side panel 55. The securing pieces 531 are not coplanar with the blocking member 533. A bent flange 551 is perpendicularly bent in from a top edge of the second side panel 55, and a mounting hole 5513 is defined in the bent flange 551. The second side panel 55 defines three spaced pairs of cutouts 553 in a side edge thereof adjacent to the mounting hole 5513, and each pair of cutouts 553 forms a tab 555 therebetween.

Figure 2:
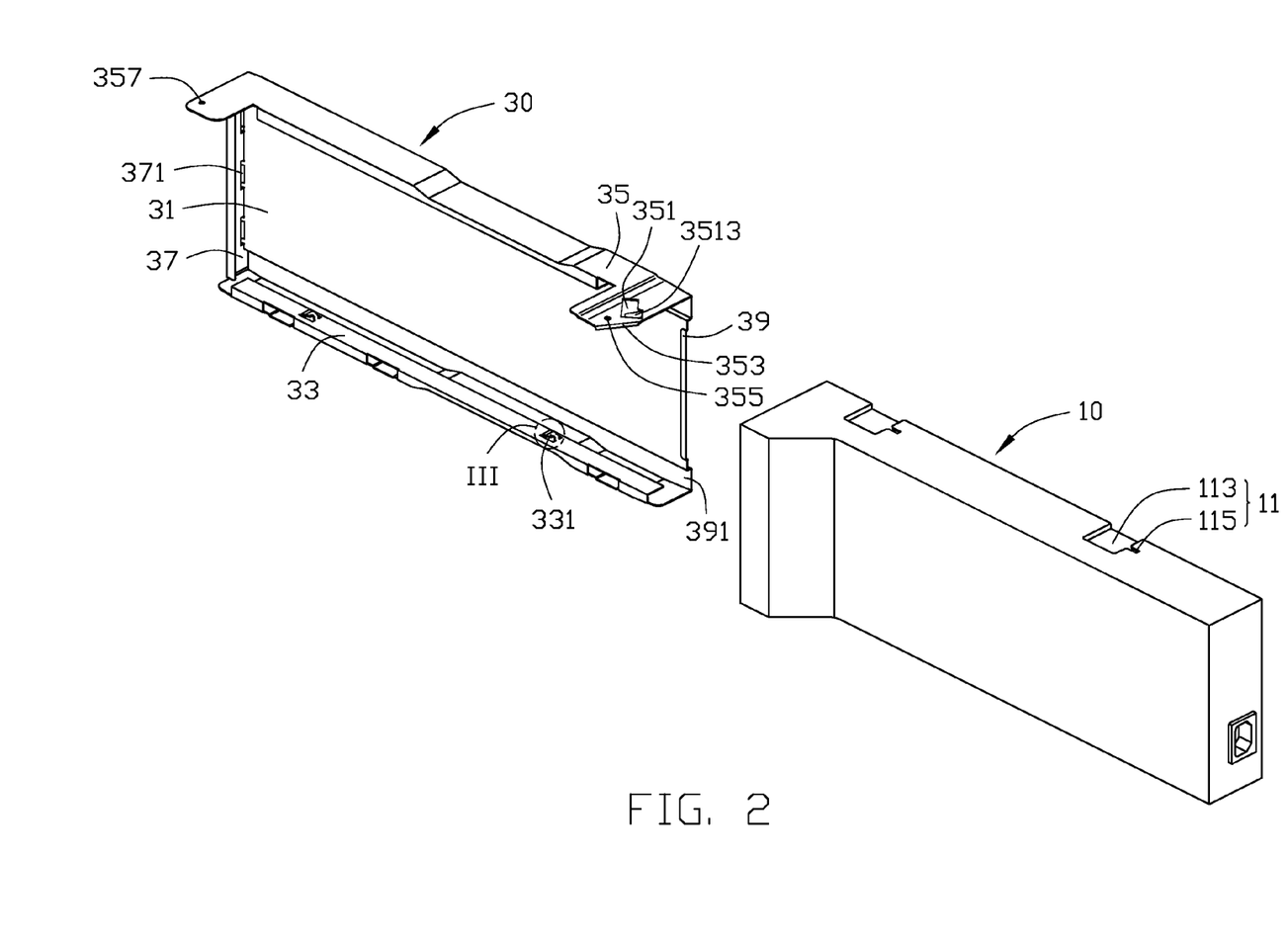
FIG. 2 is an exploded, isometric view of the power supply and the securing bracket in FIG. 1.
Figure 3:
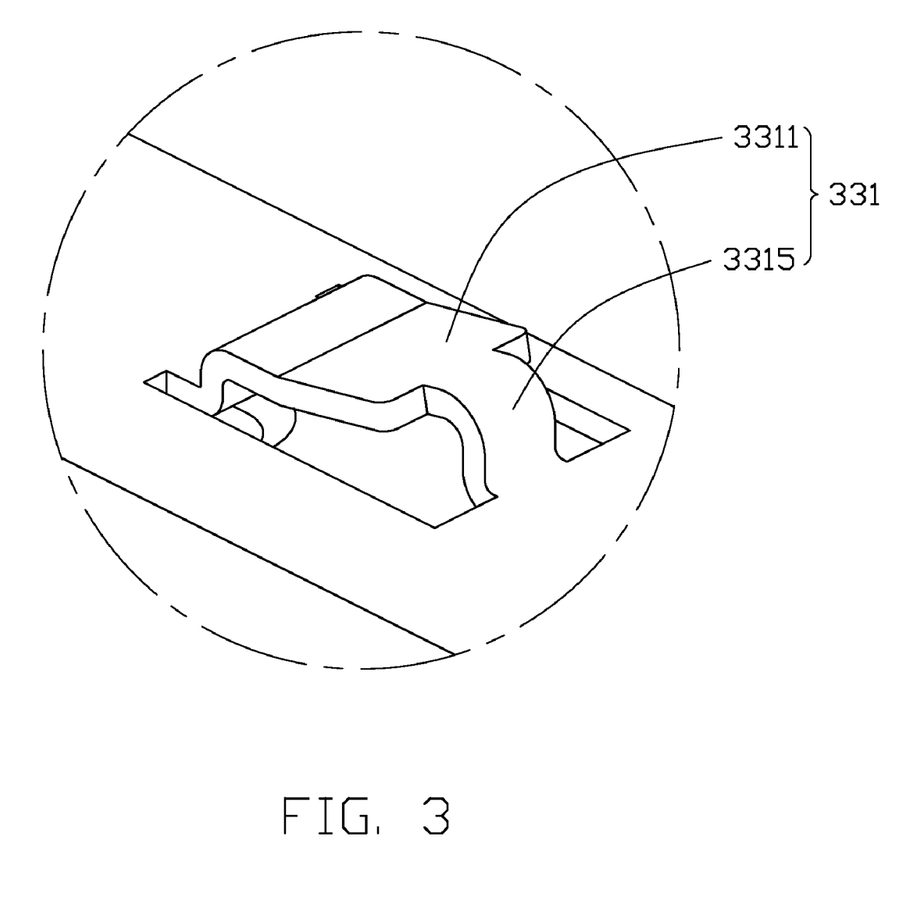
FIG. 3 is an enlarged view of III in FIG. 2.

Referring to FIG. 2 and FIG. 3, the securing bracket 30 includes a side plate 31 and two bent plates 33, 35 extending perpendicularly from two opposite edges of the side plate 31. A fixing member 331 is punched from an inner surface of each bent plate 33, 35, corresponding to each notch 11 of the power supply 10. Each fixing member 331 includes an abutting portion 3311 and a stopper portion 3315. The width of the abutting portion 3311 is less than that of the wide portion 113 of the notch 11, and the width of the stopper portion 3315 is generally the same as that of the narrow portion 115 of the notch 11, for fixing each fixing member 331 into the corresponding notch 11. A blocking plate 37 extends perpendicularly from one of the other two opposite edges of the side plate 31, for abutting the power supply 10. Three securing portions 371 protrude from the connecting portion of the blocking plate 37 and the side plate 31, each securing portion 371 having a rectangular slot, for securing the corresponding tab 555 therein. A recess 39 is defined in the side plate 31 opposite to the blocking plate 37, corresponding to the blocking member 533 of the computer case 50. Two receiving portions 391 are formed on two sides of the recess 39 respectively for receiving the two securing pieces 531 of the computer case 50. The length of the recess 39 is generally the same as that of the blocking member 533, the size of each receiving portion 391 is generally the same as that of the corresponding securing piece 531. Therefore, when the securing bracket 30 is installed in the computer case 50, the blocking member 533 is received in the recess 39, and the two securing pieces 531 are received in the corresponding receiving portion 391 to prevent the securing bracket 30 moving along a direction perpendicular to the bottom panel 51 in the computer case 50. The bent plate 35 defines an opening 351 at one end corresponding to the resilient clip 5351 of the first side panel 53 of the computer case 50. A tongue 3513 extends down from a wide end of an edge of the opening 351. A through hole 355 is defined in the bent plate 35 adjacent to the opening 351, corresponding to the mounting hole 5353 of the first side panel 53. An assembly piece 353 extends down from the edge of the bent plate 35 adjacent to the through hole 355 convenient for fixing the securing bracket 30 in the computer case 50. A through hole 357 is defined in the other end of the bent plate 35 corresponding to the mounting hole 5513 of the second side panel 55 of the computer case 50.

Figure 5:
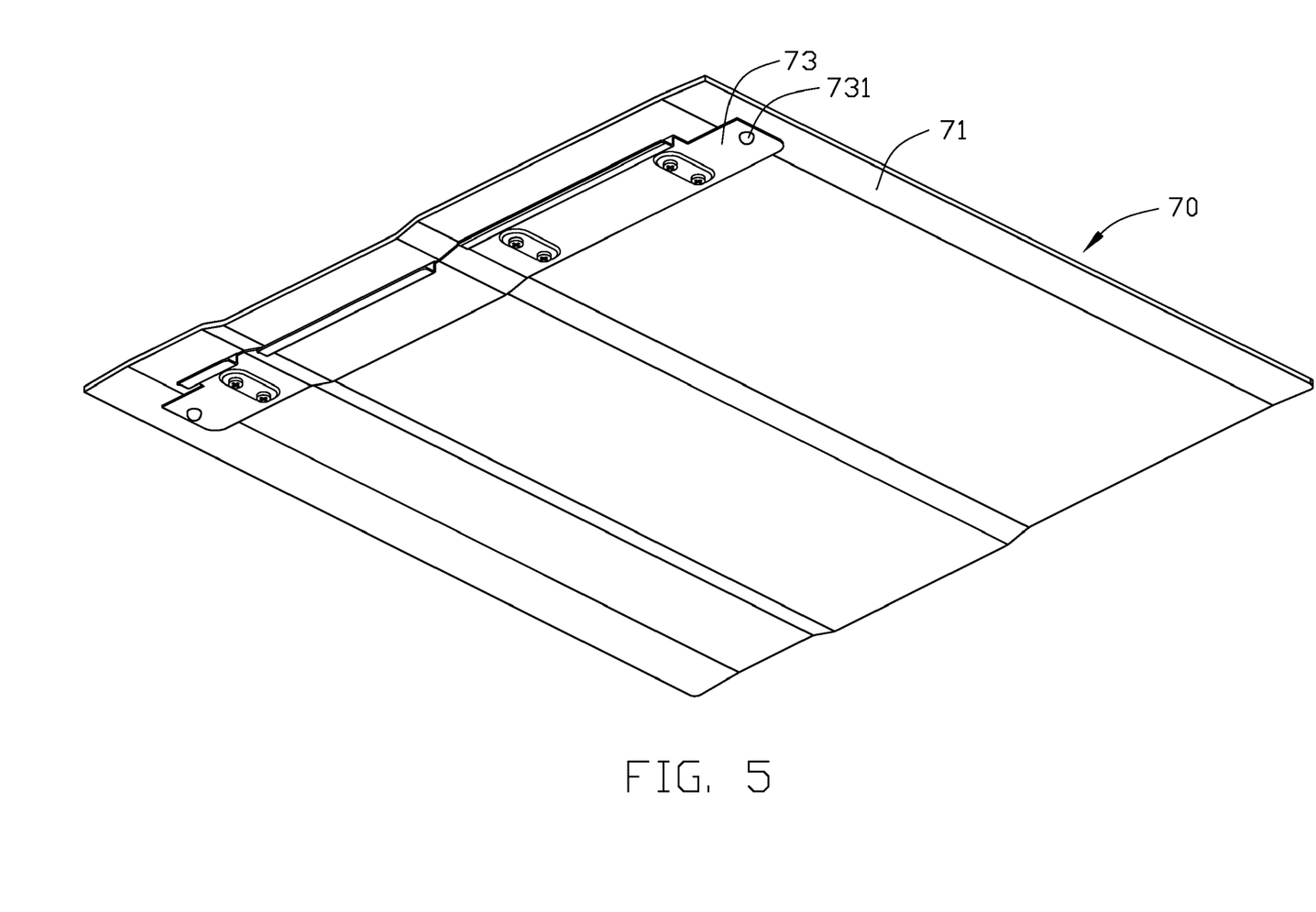
FIG. 5 is an isometric view of a top panel in FIG. 1.
Figure 6:
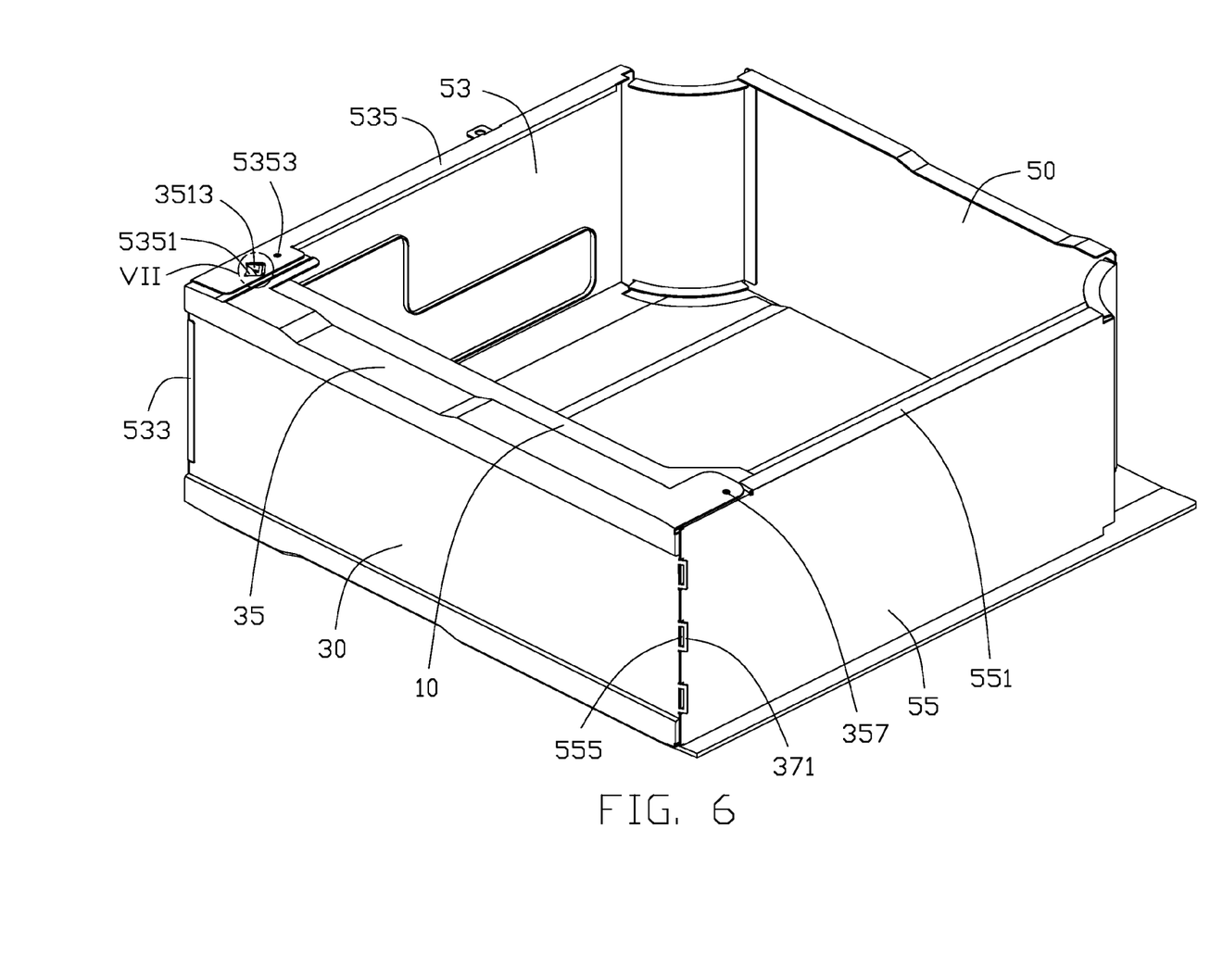
FIG. 6 is an assembled isometric view of FIG. 4.
Figure 7:
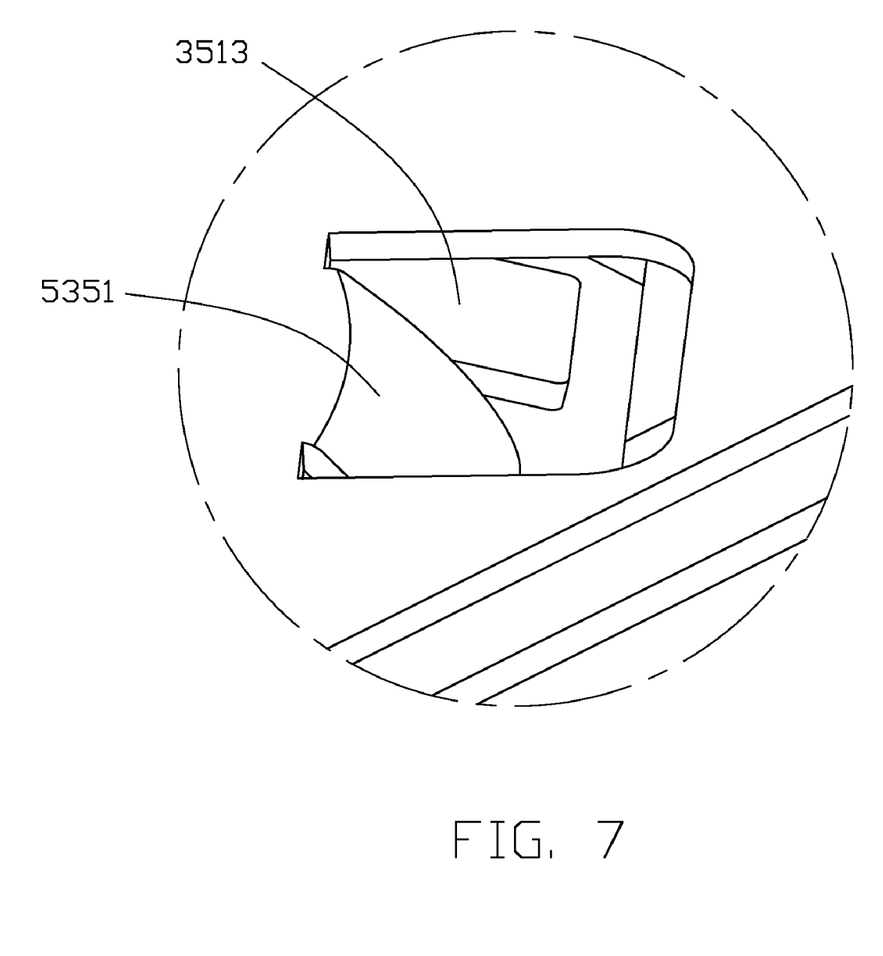
FIG. 7 is an enlarged view of VII in FIG. 6.
Figure 8:
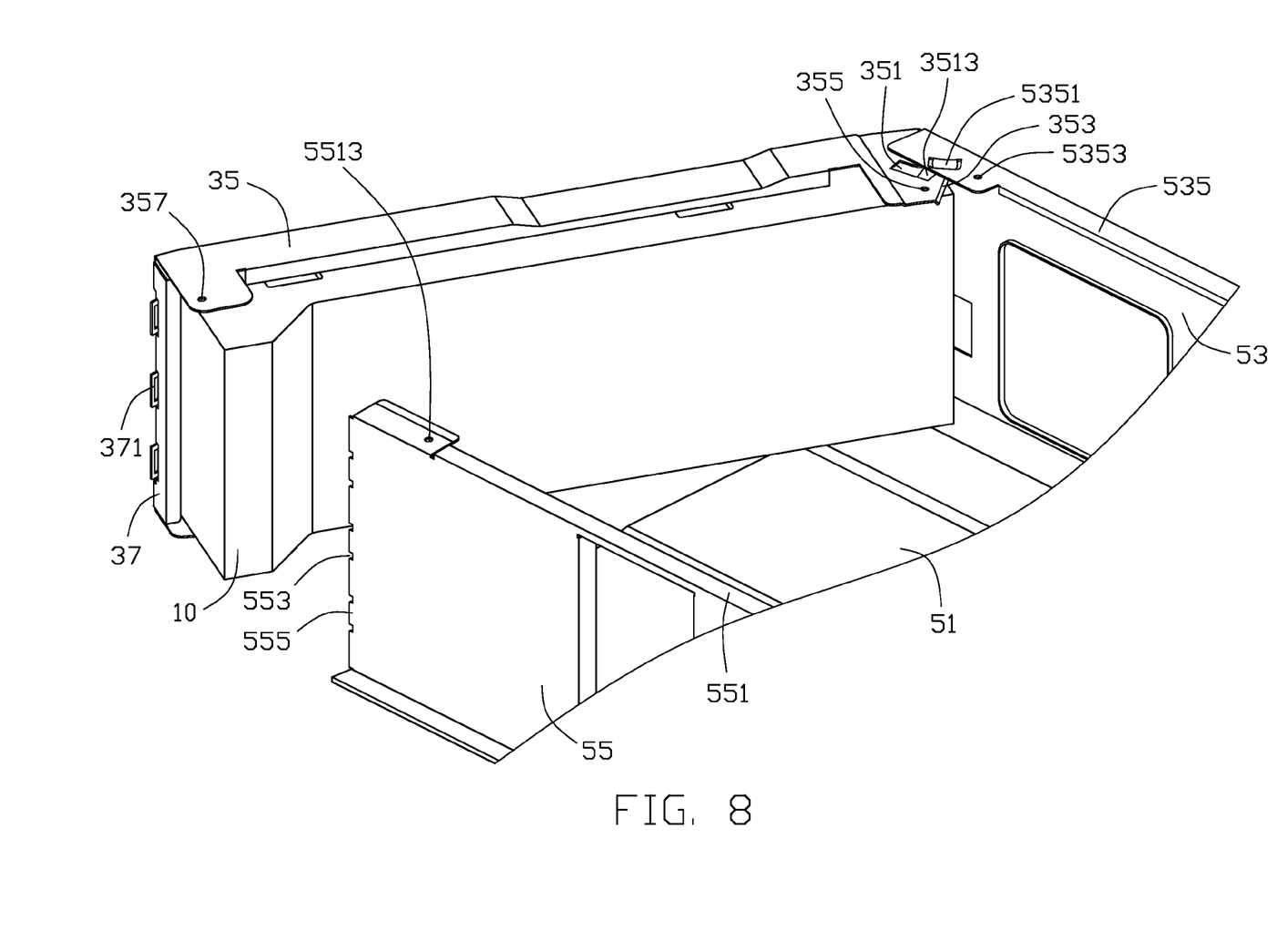
FIG. 8 is an assembled view of the mounting apparatus for the power supply, but not showing the top panel.
Figure 9:
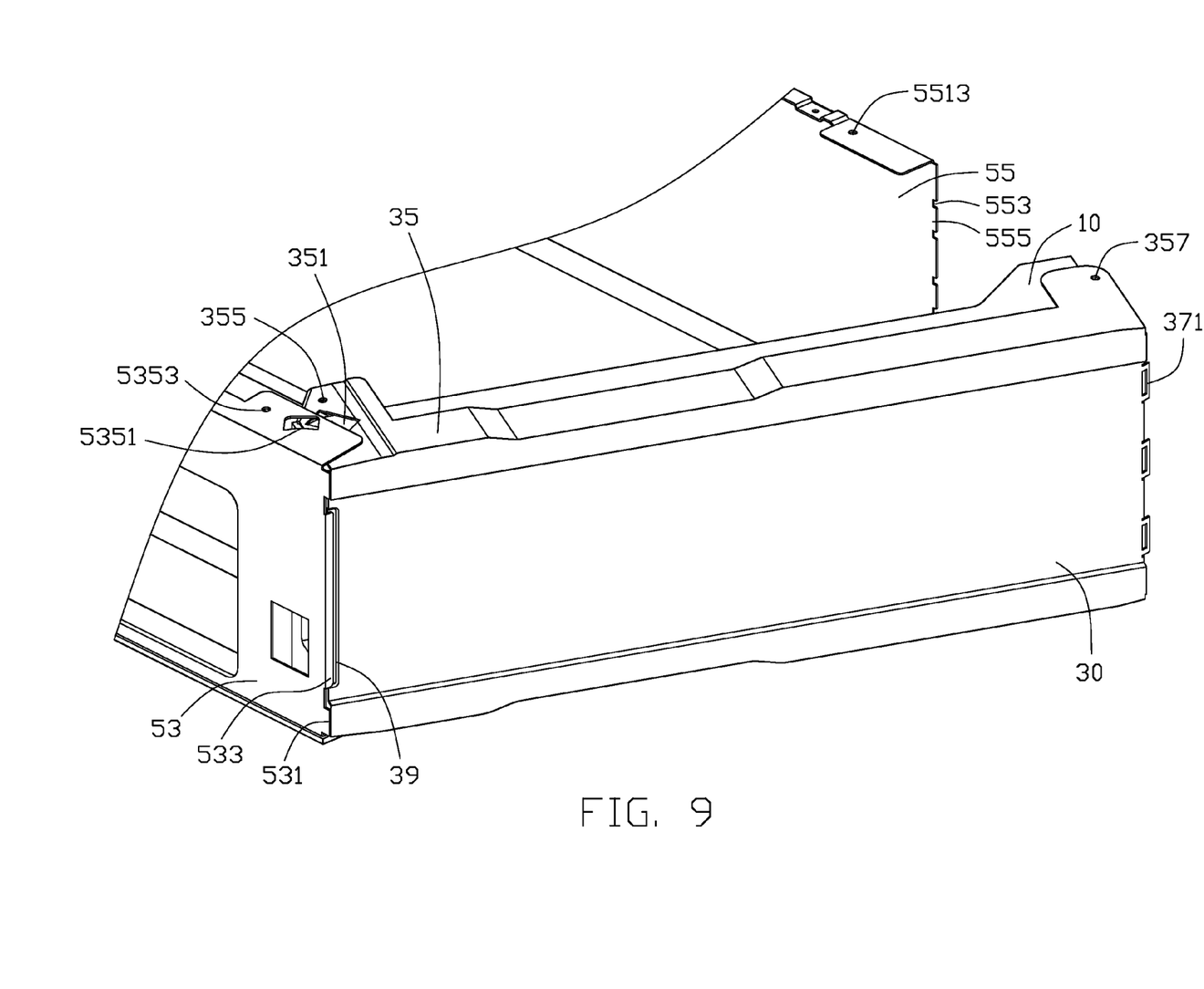
FIG. 9 is an assembled view of the mounting apparatus for the power supply similar to FIG. 8, but viewed from another aspect.
Figure 10:
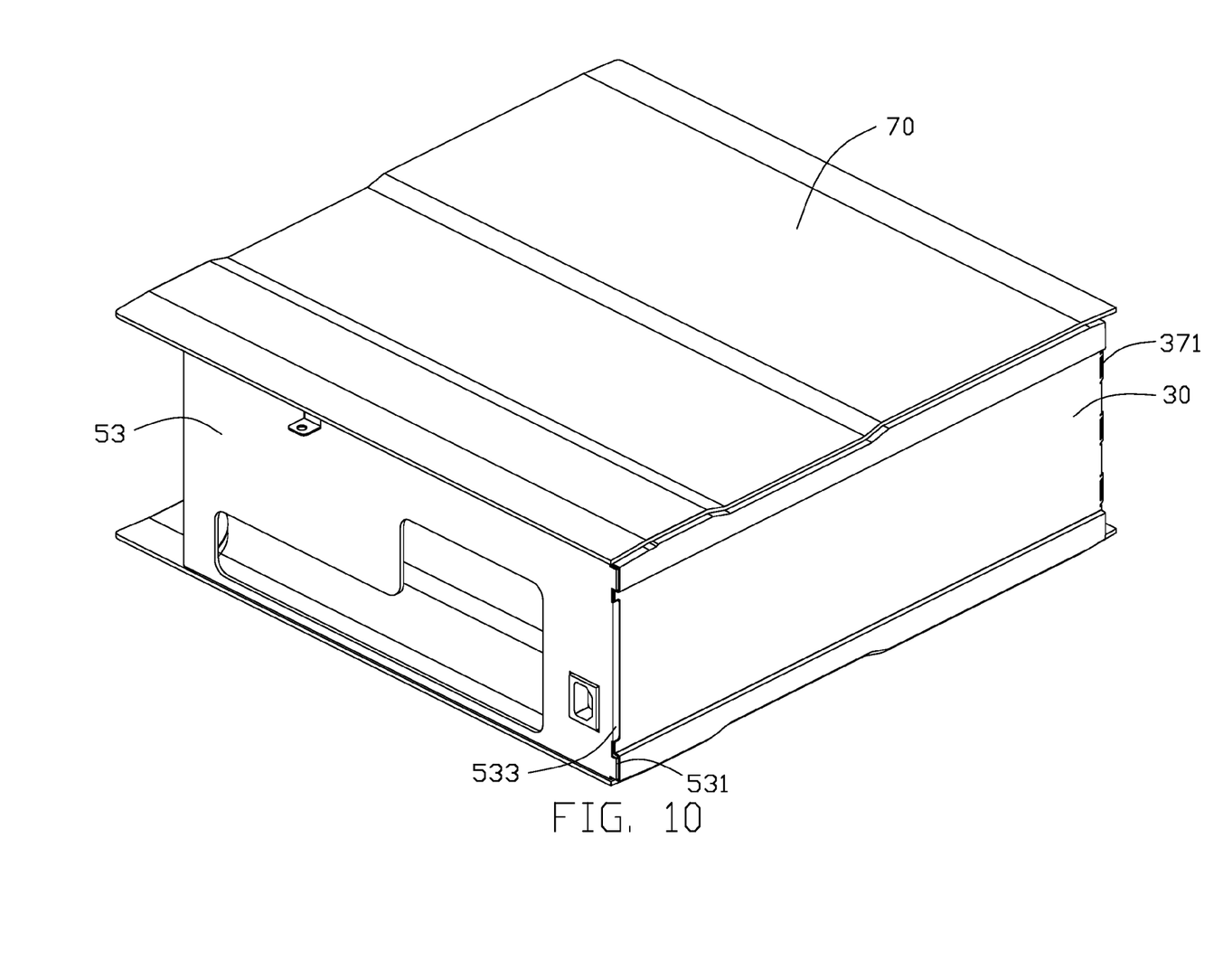
FIG. 10 is an assembled isometric view of the mounting apparatus for the power supply of FIG. 1.

Referring to FIG. 5, the top panel 70 includes a rectangular body 71, and a mounting plate 73 mounted on a bottom surface of the body 71. Two protrusions 731 protrude from two ends of the mounting plate 73 respectively, corresponding to the two mounting holes 5353, 5513 of the computer case 50 and the two through holes 355, 357 of the securing bracket 30, and each protrusion 731 can be pressed into the corresponding mounting hole 5353, 5513 and through hole 355, 357.

Referring also from FIG. 6 to FIG. 10, in assembly, the power supply 10 is placed in the securing bracket 30, and the fixing members 331 of the securing bracket 30 are aligned with the wide portions 113 of the corresponding notches 11 of the power supply 10. Then the power supply 10 is pushed toward the blocking plate 37 of the securing bracket 30, and blocked by the blocking plate 37. The fixing members 331 of the securing bracket 30 are fixed in the corresponding notches 11 of the power supply 10. The abutting portion 3311 of each fixing member 331 is received in the wide portion 113 of the corresponding notch 11, and the stopper portion 3315 of each fixing member 331 is fixed in the narrow portion 115 of the corresponding notch 11. A side surface of the power supply 10 abuts against an inner surface of the side plate 31 of the securing bracket 30. Therefore, the power supply 10 is firmly mounted in the securing bracket 30. Then, one side of the securing bracket 30 with the power supply 10 mounted therein is installed in the computer case 50. The blocking member 533 of the first side panel 51 abuts on the recess 39 of the securing bracket 30, and the two securing pieces 531 of the first side panel 51 are received in the corresponding receiving portion 391 of the securing bracket 30 to prevent the securing bracket 30 moving along a direction perpendicular to the bottom panel 51 in the computer case 50. The other side of the securing bracket 30 is pushed to rotate in the computer case 50. The assembly piece 353 of the securing bracket 30 and the tongue 3513 in the opening 351 respectively slide through the bottom end of the resilient clip 5351 of the computer case 50, and the resilient clip 5351 is resiliently deformed until the resilient clip 5351 is located in the opening 351 and abuts on a side edge of the tongue 3513. At this time, the tabs 555 of the second side panel 55 of the computer case 50 are respectively fixed in the corresponding securing portion 371, and the two sides of each securing portion 371 are fixed in the corresponding cutouts 553. Therefore, the securing bracket 30 with the power supply 10 mounted therein is fixed in the computer case 50. The top panel 70 is disposed on the top of the computer case 50, and the protrusions 731 of the top panel 70 are respectively pressed into the two mounting holes 5353, 5513 of the computer case 50 and the two through holes 355, 357 of the securing bracket 30. Therefore, the top panel 70 is mounted on the computer case 50 to finish the assemblage of the power supply 10.

In disassembly, the top panel 70 is removed from the computer case 50. The securing bracket 30 with the power supply 10 mounted therein is rotated away from the computer case 50 about en engagement between the blocking member 533 and the recess 39, and each securing portion 371 is disengaged from the corresponding tab 555. The tongue 3513 of the securing bracket 30 slides through the bottom end of the resilient clip 5351 of the computer case 50. The securing pieces 531 of the computer case 50 are blocked between the securing bracket 30 and the power supply 10. Therefore, the power supply 10 can be removed from the securing bracket 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply securing system, comprising:
    a securing bracket comprising a securing portion and capable of receiving a power supply;
    a computer case comprising a first side panel and a second side panel that is parallel to the first side panel; the first side panel comprising a blocking member capable of abutting the securing bracket and a securing piece received by the securing bracket; the second side panel comprising a tab;
    wherein the securing bracket is pivotably mounted to the computer case about the securing piece and the securing bracket is capable of moving between a first position and a second position, the tab is engaged with the securing portion in the first position and the tab is not engaged with the securing portion in the second position.

2. The power supply securing system as described in claim 1, wherein the securing bracket comprises a side plate and a recess being defined on a first edge of the side plate engaging with the blocking member of the first side panel; the securing portion protrudes from a second edge of the side plate.

3. The power supply securing system as described in claim 2, wherein the securing piece is not coplanar with the blocking member, and a receiving portion is formed on the securing bracket for receiving the securing piece.

4. The power supply securing system as described in claim 2, wherein a blocking plate extends perpendicularly from the side plate for abutting the power supply.

5. The power supply securing system as described in claim 1, wherein a bent flange extends perpendicular from a top edge of the first side panel, and a resilient clip is located on the bent flange; an opening is defined on the securing bracket corresponding to the resilient clip, and a tongue extends down from an edge of the opening.

6. The power supply securing system as described in claim 5, the system further comprises a top panel and two protrusions that protrude from the top panel; wherein the bent flange defines a first mounting hole adjacent to the resilient clip, the second side panel defines a second mounting hole opposite to the mounting hole, two through holes are defined on the securing bracket corresponding to the first and second mounting holes.

7. A computer, comprising:
a power supply;
a securing bracket for receiving the power supply therein; and
a computer case having a first side panel and a second side panel that is parallel to the first side panel;
the securing bracket located between the first side panel and the second side panel;
the first side panel comprising a securing piece, the securing piece extending through a first side of the securing bracket from an outer side of the securing bracket to an inner side of the securing bracket, and the securing piece located between the power supply and the securing bracket, the securing piece supporting the securing bracket, a second side of the securing bracket being engaged with the second side panel;
wherein the securing bracket is capable of being rotated between a first position and a second position, the second side of the securing bracket is engaged with the second side panel in the first position and is disengaged from the second side panel in the second position.

8. The computer as described in claim 7, wherein the securing bracket defines a recess, the first side panel forms a blocking member engaging in the recess.

9. The computer as described in claim 8, wherein a securing portion protrudes from the second side of the securing bracket, the second side panel comprises a tab that is secured in the securing portion.

10. The computer as described in claim 9, wherein the securing bracket comprises a side plate, the recess being defined on a first edge of the side plate, and the securing portion protrudes from a second edge of the side plate.

11. The computer as described in claim 10, wherein the securing piece is not coplanar with the blocking member, and a receiving portion is formed on the securing bracket for receiving the securing piece.

12. The computer as described in claim 10, wherein a blocking plate extends perpendicularly from the side plate for abutting the power supply.

13. The computer as described in claim 7, wherein a bent flange extends perpendicular from a top edge of the first side panel, and a resilient clip is located on the bent flange, an opening is defined on the securing bracket corresponding to the resilient clip, and a tongue extends down from an edge of the opening.

14. The computer as described in claim 13, wherein the bent flange defines a first mounting hole adjacent to the resilient clip, the second side panel defines a second mounting hole opposite to the mounting hole, two through holes are defined on the securing bracket corresponding to the first and second mounting holes; the computer further comprises a top panel, and two protrusions that protrude from the top panel.

15. The computer as described in claim 7, wherein at least one notch is defined in one sidewall of the power supply, a fixing member is disposed on the securing bracket, for fixing into the notch to secure the power supply to the securing bracket.

16. The computer as described in claim 15, wherein the notch comprises a wide portion and a narrow portion connected to the wide portion; the fixing member comprises an abutting portion received in the wide portion and a stopper portion fixed in the narrow portion.

17. A computer, comprising:
a power supply comprising a notch defined in one sidewall thereof;
a securing bracket for receiving the power supply therein, a fixing member being disposed on the securing bracket for cooperating with the notch to secure the power supply; and
a computer case having a first side panel and a second side panel that is parallel to the first side panel, the securing bracket being rotatably mounted between the first side panel and the second side panel;
wherein the securing bracket defines a recess, and the first side panel forms a blocking member engaging the recess.

18. The computer as described in claim 17, wherein the notch comprises a wide portion and a narrow portion connected to the wide portion, the fixing member comprises an abutting portion received in the wide portion and a stopper portion fixed in the narrow portion.

19. The computer as described in claim 17, wherein a securing portion protrudes from the securing bracket, and the second side panel comprises a tab secured in the securing portion.

20. The computer as described in claim 17, wherein the securing bracket comprises a side plate, the recess is defined on a first edge of the side plate, and the securing portion protrudes from a second edge of the side plate.

* * * * *